United States Patent
Aijaz

(10) Patent No.: US 11,310,006 B2
(45) Date of Patent: Apr. 19, 2022

(54) RESOURCE ALLOCATION FOR CLOSED-LOOP CONTROL IN 5G WIRELESS NETWORKS

(71) Applicant: Kabushiki Kaisha Toshiba, Minato-ku (JP)

(72) Inventor: Adnan Aijaz, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 6 days.

(21) Appl. No.: 16/851,257

(22) Filed: Apr. 17, 2020

(65) Prior Publication Data
US 2021/0328736 A1 Oct. 21, 2021

(51) Int. Cl.
*H04L 5/00* (2006.01)
*H04W 72/12* (2009.01)

(52) U.S. Cl.
CPC ............ *H04L 5/0037* (2013.01); *H04L 5/006* (2013.01); *H04L 5/0007* (2013.01); *H04W 72/121* (2013.01); *H04W 72/1231* (2013.01); *H04W 72/1284* (2013.01); *H04W 72/1289* (2013.01)

(58) Field of Classification Search
CPC ..... H04L 5/0007; H04L 5/0037; H04L 5/006; H04W 72/121; H04W 72/1231; H04W 72/1284; H04W 72/1289
See application file for complete search history.

(56) References Cited

U.S. PATENT DOCUMENTS

| 10,135,591 | B2 | 11/2018 | Chen et al. | |
|---|---|---|---|---|
| 2011/0106952 | A1* | 5/2011 | Doppler | H04W 72/0406 709/226 |
| 2011/0250918 | A1* | 10/2011 | Jen | H04W 52/08 455/509 |
| 2018/0092104 | A1 | 3/2018 | Sheng et al. | |

OTHER PUBLICATIONS

Adnan Aijaz, et al. "The Tactile Internet for Industries: A Review" Proceedings of the IEEE, vol. 107, No. 2, Feb. 2019, pp. 414-435.
Adnan Aijaz, "Packet Duplication in Dual Connectivity Enabled 5G Wireless Networks: Overview and Challenges" IEEE Communications Standards Magazine, vol. 3, No. 3, Sep. 2019, pp. 20-28.

* cited by examiner

*Primary Examiner* — Khoa Huynh
(74) *Attorney, Agent, or Firm* — Oblon, McClelland, Maier & Neustadt, L.L.P.

(57) ABSTRACT

Network resource allocation takes place within a wireless communication channel in which resource is defined with respect to time and frequency; a resource allocation process involves joint allocation of resource for communication to and from a controlled device, to enable a cyclic exchange of information and thus to enable wireless closed loop control of the device.

18 Claims, 13 Drawing Sheets

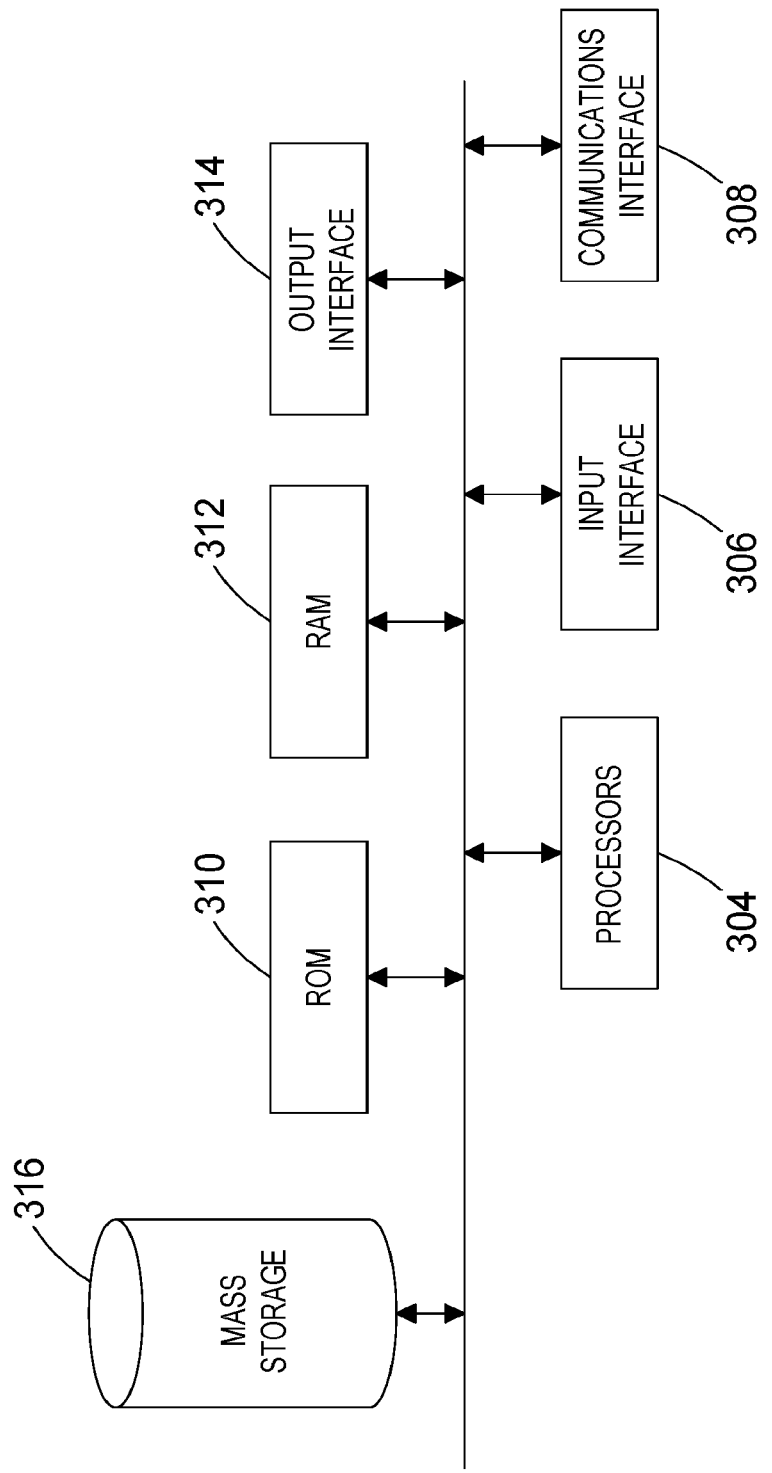

US 11,310,006 B2

RESOURCE ALLOCATION FOR CLOSED-LOOP CONTROL IN 5G WIRELESS NETWORKS

FIELD

Embodiments described herein are concerned with resource allocation for closed-loop control in wireless communication networks. The disclosure is concerned particularly, but not exclusively, with 5G wireless communication networks.

BACKGROUND

Closed loop control has habitually been implemented using wired communication, due to requirements for very low and deterministic latency and very high reliability.

DESCRIPTION OF DRAWINGS

FIG. 15 illustrates a controlled device in accordance with an embodiment.

DESCRIPTION OF EMBODIMENTS

Figure 1:
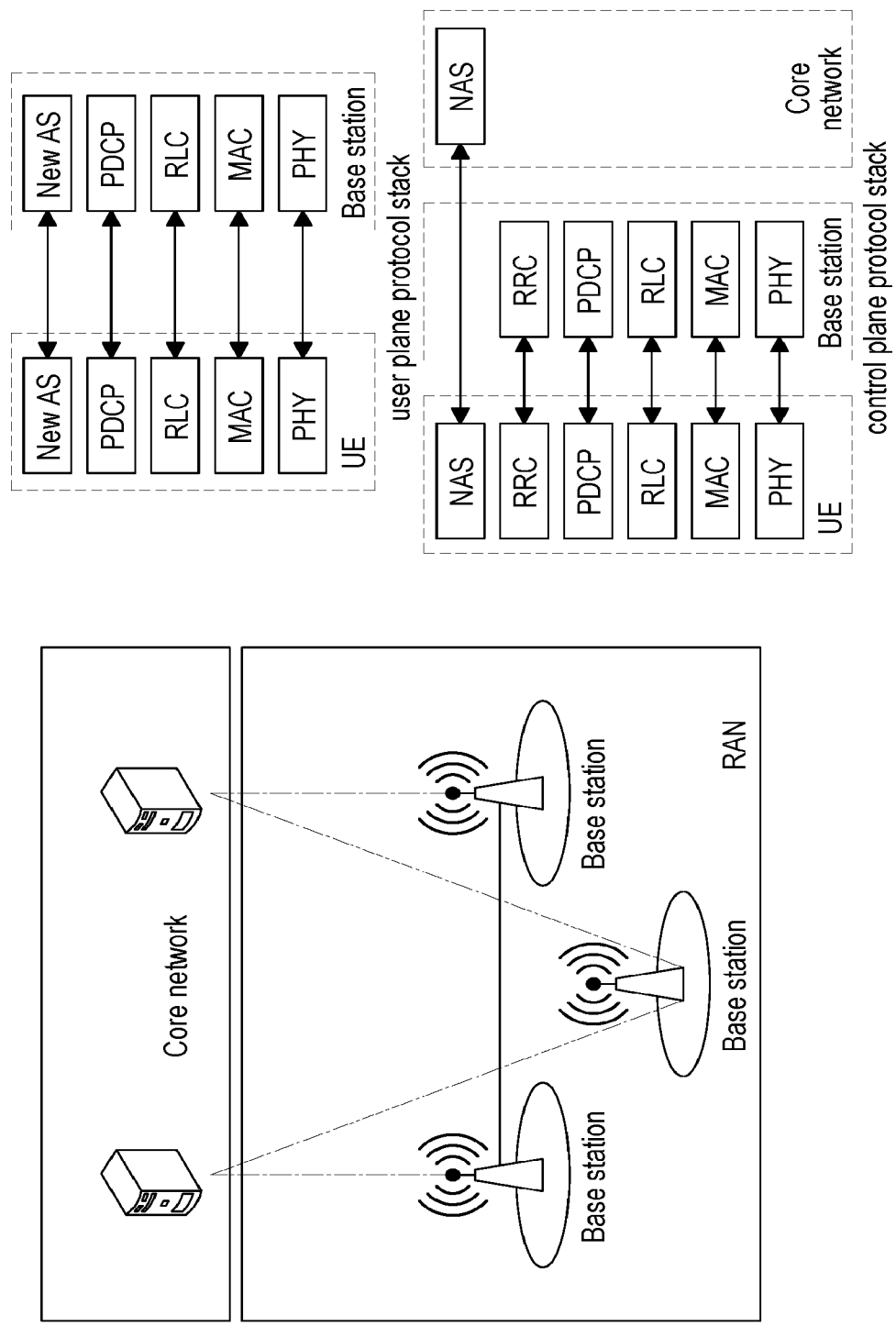
FIG. 1 illustrates architecture and protocol stack of a 5G New Radio (NR) network.

In general terms, network resource allocation takes place within a wireless communication channel in which resource is defined with respect to time and frequency; a resource allocation process involves joint allocation of resource for communication to and from a controlled device, to enable a cyclic exchange of information and thus to enable wireless closed loop control of the device.

Industrial communication has a long history which spans more than four decades. While industrial communication has habitually employed wired technologies, there is now a tendency to look for wireless technologies.

Current, industrial wireless solutions are mainly used for non-critical applications like industrial monitoring. Although some proprietary industrial wireless technologies based on Bluetooth or Wi-Fi have emerged, such solutions only meet the requirements of specific industrial applications. The emerging 5G mobile/cellular networks are being designed with native support for three main service categories: enhanced mobile broadband (eMBB) for supporting very high data rates, massive machine type communications (mMTC) for supporting a large number of devices, and ultra-reliable low latency communications (uRLLC) for real-time control applications. Hence, 5G provides a single unified wireless interface for meeting the requirements of a range of industrial applications.

One of the most prominent industrial applications is closed-loop control which, in the case of legacy industrial systems, is realized through wired technologies. 5G uRLLC creates the possibility of realizing such closed-loop control over wireless, thereby leading to many design simplifications in legacy industrial systems. Moreover, the possibility of closed-loop control over wireless creates an opportunity for industrial applications for future industrial systems (Industry 4.0 and beyond).

For effective closed-loop control in a real time application, it is desirable to provide connectivity with very low latency and very high reliability.

Closed-loop control can involve bi-directional communication between a controller and a spatially distributed system of one or multiple sensors/actuators. Such bi-directional communication has a cyclic traffic pattern that requires deterministic connectivity, i.e., minimal jitter in terms of latency between consecutive cycles. The latency, and to some extent, the reliability requirements of closed-loop control can be fulfilled by some of the key standard features of 5G wireless networks. However, handling bi-directional cyclic information exchange with deterministic as well as minimal latency requires efficient radio resource allocation techniques. Such radio resource allocation techniques are generally outside the scope of mobile/wireless standards. It is worth emphasizing that deterministic latency is also required for converged operation of 5G and Time-sensitive Networking (TSN).

To this end, embodiments disclosed herein provide a radio resource allocation framework, termed as Deterministic 5G (Det-5G), for realizing closed-loop control over 5G wireless networks. Closed-loop control typically takes place between a controller and one or more controlled devices. Specific examples of closed-loop control include remote control of mobile platforms in industrial systems and field-level communication in industrial automation. Embodiments described herein can be extended to a broad range of closed-loop control scenarios.

In general terms, embodiments described herein provide resource allocation techniques with certain characteristic features.

Aspects of the present disclosure provide a system and a method of allocating time and frequency resources in a wireless communication network comprising a base station, a controller node and a device such that the controller node and the device exchange bi-directional information wherein the controller transmits a command message to the device, referred to as downlink, and the device transmits a feedback message to the controller node, referred to as uplink, and the bi-directional information exchange occurs in a cyclic or periodic manner, over a wireless interface comprising multiple discrete timeslots (sub-frames), with a fixed number of symbols in time domain, and multiple frequency sub-carriers of fixed spacing in frequency domain.

The wireless interface may have a flexible time-slotted structure characterized by shorter timeslots of fixed or variable duration such that reduction of timeslots is achieved through increasing the sub-carrier spacing in the frequency domain or reducing the number of symbols in the time domain.

The base station may allocate time and frequency resources for communication with a wireless connected device by transmitting a resource grant message in a fixed or variable sized timeslot.

The resource grant may contain joint resource allocation information for a cycle of communication that includes downlink transmissions from the base station, uplink transmissions from the device and acknowledgement from the base station.

The resource grant may provide resource reservation for periodic exchange of cyclic information between the controller and the device.

The downlink transmissions from the base station and the uplink transmissions from the device may be repeated in adjacent timeslots such that the number of repetitions is dictated by a bundle length parameter which is transmitted by the base station in the resource grant message.

The downlink and uplink transmissions may contain user-plane information (data) or control-plane information (signaling).

Some transmissions in either downlink or uplink may contain data, while others may contain forward error correction (FEC) information, such that transmissions containing data and FEC information are combined at the receiver.

The base station may allocate time and frequency resources for communication between a wirelessly connected controller node and a wirelessly connected device by transmitting a scheduling grant message in a fixed or variable sized timeslot.

The resource grant may contain resource allocation information for a cycle of communication that includes uplink transmissions from the controller, downlink transmissions from the base station to the device, uplink transmissions from the device, downlink transmissions from the base station to the controller, acknowledgement from the controller to the base station and acknowledgement from the base station to the device.

The resource grant may provide resource reservation for periodic exchange of cyclic information between the controller and the device.

The resource grant message may comprise a bundle length parameter; a transmission in downlink or uplink may be repeated as dictated by the bundle length parameter.

In an embodiment, the base station may allocate time and frequency resources for direct downlink communication from the controller to the device and direct uplink communication from the device to the controller.

An aspect of the present disclosure comprises a method of determining the length of a bundled transmission, which comprises one or more individual transmissions, based on meeting a target signal-to-interference-plus-noise ratio (SINR) at a receiver (base station, controller or device).

The length of a bundled transmission may be calculated by determining the signal-to-noise ratio (SNR) gain of one or more coded (data+FEC) or uncoded (data only) transmissions.

Embodiments provide joint uplink/downlink resource allocation. By comparison, certain existing resource allocation techniques treat downlink and uplink resource allocation independently. Such independent downlink/uplink resource allocation may not be suitable for closed-loop control as it may prohibit providing deterministic latency guarantees. Moreover, in the case of closed-loop control, it is desirable to tightly couple downlink and uplink resource allocation owing to bi-directional information exchange. Therefore, joint downlink/uplink resource allocation ensures stability of closed-loop control. Embodiments disclosed herein implement techniques for joint resource allocation in uplink and downlink.

Further, embodiments disclosed herein provide self-contained allocation. A conventional approach to resource allocation involves separate treatment of control information transmission, data transmission, retransmission and acknowledgement transmission. According to embodiments disclosed herein, self-contained resource allocation is implemented, while accounting for the aforementioned transmissions. This is particularly attractive for cyclic information exchange pertaining to closed-loop control.

Further, embodiments disclosed herein exploit bundled transmissions facilitated by low-latency of 5G networks. Bundled transmissions can be extended to both the control-plane and the user-plane. Moreover, embodiments disclosed herein use bundled transmissions to support error correction functionality. Furthermore, the size of a bundled transmission can be dynamically adjusted based on link-level parameters.

Specific embodiments will now be described, with reference to the appended drawings.

The present disclosure mainly focuses on the scenario of closed-loop control between a controller and a single device through a 5G network. This scenario reflects a range of industrial applications such as remote control of mobile platforms and remote operation of industrial machines or robots.

FIG. 1 illustrates the architecture and protocol stack (user-plane as well as control-plane) of a 5G New Radio (NR) network. As shown, the core network comprises a plurality (in this case two) of networked computers, in wireless connection with a radio access network (RAN) comprising a plurality of base stations in wireless and/or wired interconnection with each other.

The terminology for the protocol stack layers is as follows. The 4G Long Term Evolution (LTE) network has a similar architecture with a slightly different terminology for entities and interfaces. The 4G-LTE network has a similar protocol stack with the exception of the AS layer. However, the actual protocol layer functionality could be different for the two networks.

Abbreviations used in FIG. 1 to denote layers of the various protocol stacks include:
PHY—Physical layer
MAC—Medium access control layer
RLC—Radio link control layer
PDCP—Packet data convergence protocol layer
RRC—Radio resource control layer
NAS—Non-access stratum layer
AS—Access stratum layer One of the main differences between 4 G-LTE and 5 G-NR is that the former uses a fixed numerology of 15 kHz orthogonal frequency division multiplexing (OFDM) sub-carrier spacing, whereas the latter supports a scalable numerology with sub-carrier spacing of 15 kHz, 30 kHz, and 60 kHz for below 6 GHz and 60 kHz and 120 kHz for above 6 GHz operation. A higher sub-carrier spacing leads to reduction in timeslot duration. In 4G-LTE, a slot comprises 14 OFDM symbols and corresponds to a transmission time interval (TTI). A reduction in TTI is possible through either scaling the sub-carrier spacing or fewer number of OFDM symbols.

According to the present disclosure, certain terminology needs to be defined for examples herein.

Short TTI—In disclosed examples, a short TTI contains the same number of OFDM symbols as in 4G-LTE with a higher sub-carrier spacing (e.g., 30 kHz) or utilizes fewer number of OFDM symbols (e.g., 7, 3, or 2 symbols).

Mini-slot—In disclosed examples, a mini-slot can start at any OFDM symbol and it has variable length in terms of the number of OFDM symbols irrespective of the numerology.

Figure 2:
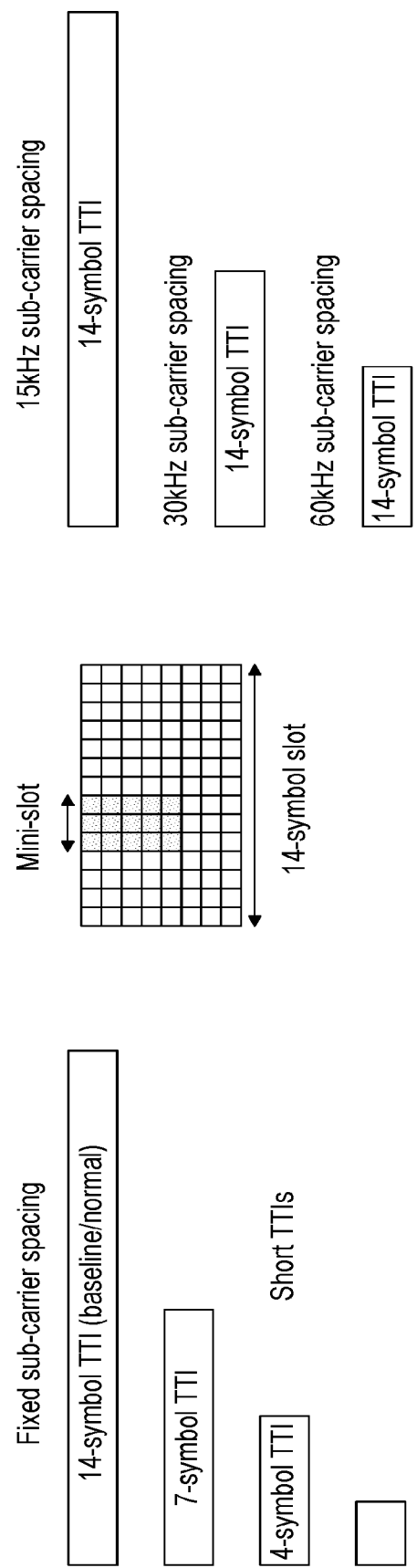
FIG. 2 illustrates scalable OFDM numerology, in accordance with embodiments disclosed herein.

The concepts of scalable OFDM numerology, short TTIs and mini-slots are illustrated in FIG. 2. As shown on the left of the diagram, a baseline/normal TTI is illustrated as 14 symbols in length, with examples of short TTIs at 7, 4 and 2 symbols length illustrated below. In the centre of the diagram, a mini-slot is shown, shaded in a 14 symbol slot, of across an arbitrary number of sub-carriers and across an arbitrary number of symbols.

On the right hand side of FIG. 2, various different length short TTIs are illustrated, effected by altering the sub-carrier spacing while retaining the number of symbols at 14.

The reader will note that the concept of short TTIs is applicable to a 4G system as well; however, mini-slots are specific to a 5G system only.

Figure 3:
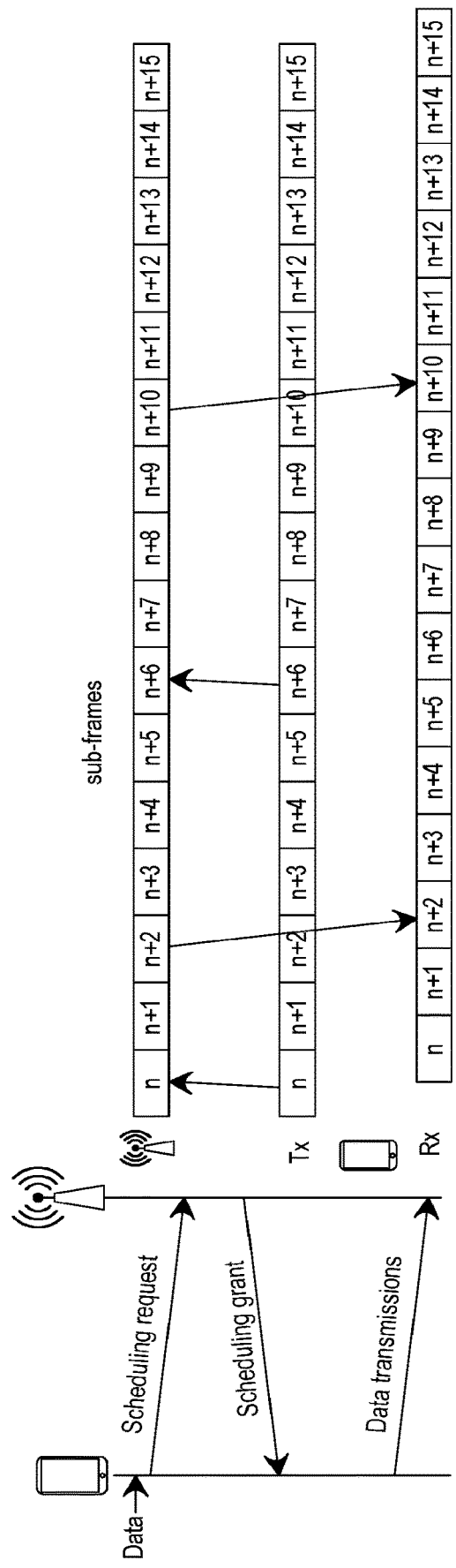
FIG. 3 illustrates a resource allocation procedure within 4G-LTE or 5G.

The standard resource allocation procedure in 4 G-LTE and 5 G is illustrated in FIG. 3. The left hand side of FIG. 3 is a simple swim lane diagram showing communication between a mobile handset (user equipment, UE) and a base station (eNB or gNB). The right hand side of the diagram shows the scheduling of messages sent at each stage in the process.

In the case of uplink transmission, the UE transmits a scheduling request message to the base station on the physical uplink control channel (PUCCH) at the next available opportunity, i.e., sub-frame n. Upon successful reception of the scheduling request, the base station transmits a downlink control packet containing the scheduling grant message on the physical downlink control channel (PDCCH) in sub-frame n+2. The scheduling grant contains the number and the position/location of the assigned resource blocks (RBs). The first data packet is transmitted by the UE on the physical uplink shared channel (PUSCH) at (typically) 4 sub-frames after receiving the scheduling grant.

If a UE has additional data to send (which is indicated by a buffer status report as part of the scheduling request message), the base station schedules further RBs and sends the next scheduling grant message at (typically) 4 sub-frames after receiving the first uplink transmission, i.e., sub-frame n+10. Therefore, subsequent uplink data transmissions take place every 8 sub-frames. In case of downlink transmission, the base station dynamically schedules a UE. It transmits the downlink grant on the PDCCH which indicates the position/location of the downlink data on the physical downlink shared channel (PDSCH).

At the medium access control (MAC) layer, retransmissions are handled through a hybrid automatic repeat request (HARQ) which is a combination of forward error correction (FEC) and ARQ error control. For a downlink transmission, the device provides acknowledgement (ACK) or negative acknowledgment (NACK) on the PUCCH. For an uplink transmission, the base station provides ACK/NACK on the physical HARQ indicator channel (PHICH).

Figure 4:
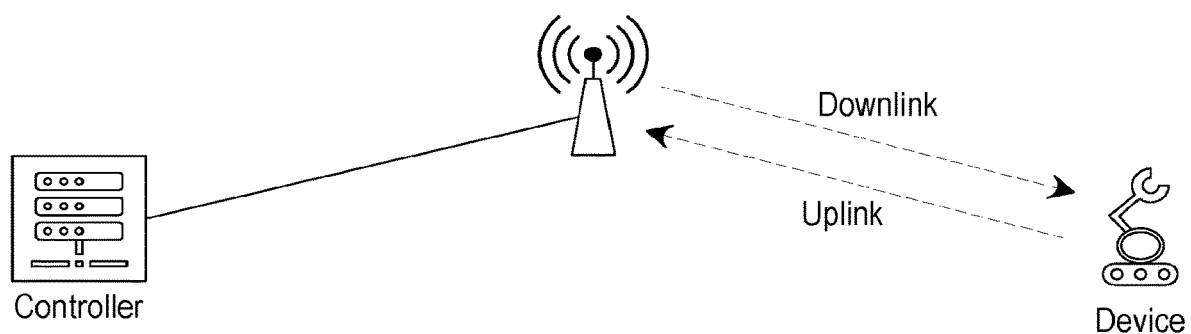
FIG. 4 illustrates an embodiment of a communication network.

FIG. 4 illustrates a scenario wherein a controller is directly connected to a base station through a wired interface; by contrast, a device is connected to the base station through a wireless interface. The arrows marked "downlink" and "uplink" refer to communication from the base station (or controller) to the device and vice versa, respectively.

Figure 5:
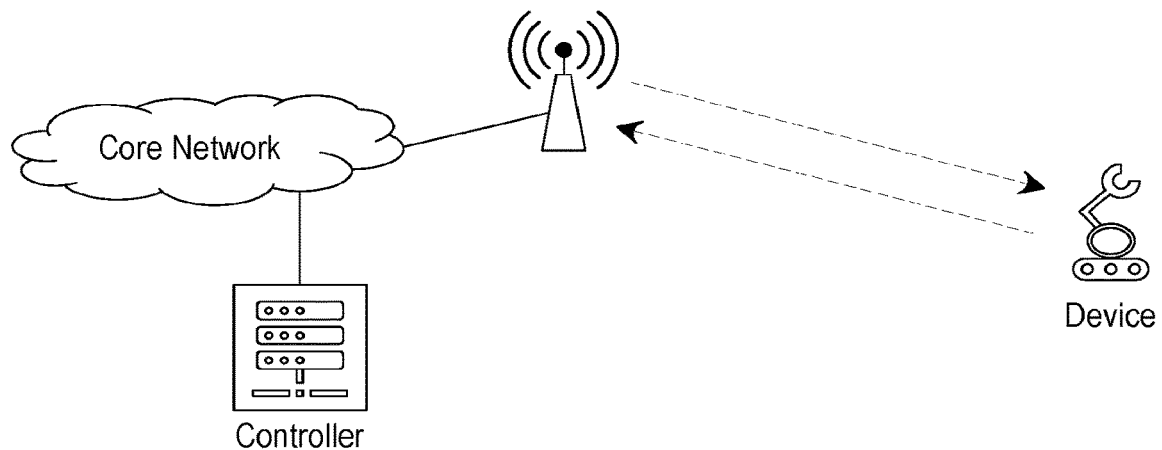
FIG. 5 illustrates an embodiment of a communication network.

The reader will note that the controller could alternatively be connected to the core network through a wired interface as illustrated in FIG. 5. From a resource allocation perspective, both scenarios are similar.

Owing to scalable numerology, short TTIs and mini-slots, a flexible frame structure can be realized wherein the time and frequency structure of sub-frames can be dynamically adjusted. For the benefit of this example, a baseline numerology is established, based on a baseline sub-frame duration, comprising an integer number of OFDM symbols. For example, assuming a baseline numerology with 15 kHz sub-carrier spacing, a sub-frame comprising 14 OFDM symbols is 1 millisecond (ms) in duration.

A sub-frame further comprises a certain number of short TTIs. The short TTIs can be defined in two distinct ways. Firstly, short TTIs can be defined with respect to the baseline numerology and consist of a fewer number of OFDM symbols than the defined baseline/normal number of OFDM symbols for a standard length TTI. Secondly, short TTIs can be defined as being of fixed duration but with a different OFDM numerology than the baseline numerology.

Typically, one cycle of closed-loop control involves a command message from the controller which triggers a sensor or actuation feedback from the device. Therefore, for the purposes of this example, a downlink transmission from the base station (controller) generally precedes an uplink transmission from the device.

However, it will be appreciated that the resource allocation techniques of the present disclosure can be applied to the scenario of an uplink transmission preceding a downlink transmission.

An aspect of the present disclosure concerns joint uplink/downlink resource allocation. This entails joint design for both resource assignment and data transmission. Another aspect of the present disclosure is self-contained allocation to handle cyclic information exchange in an optimized manner. A design principle of aspects of the present disclosure is to enable a self-contained transmission that successfully supports a cycle of information between the controller and the device.

Another aspect of the present disclosure is bundled transmission wherein a transmission is repeated multiple times as dictated by a unique bundle size parameter. This is to improve the reliability of a single control or a data transmission, in order to avoid delays arising due to feedback-based retransmission techniques like HARQ at the MAC layer and ARQ at the RLC layer.

Figure 6:
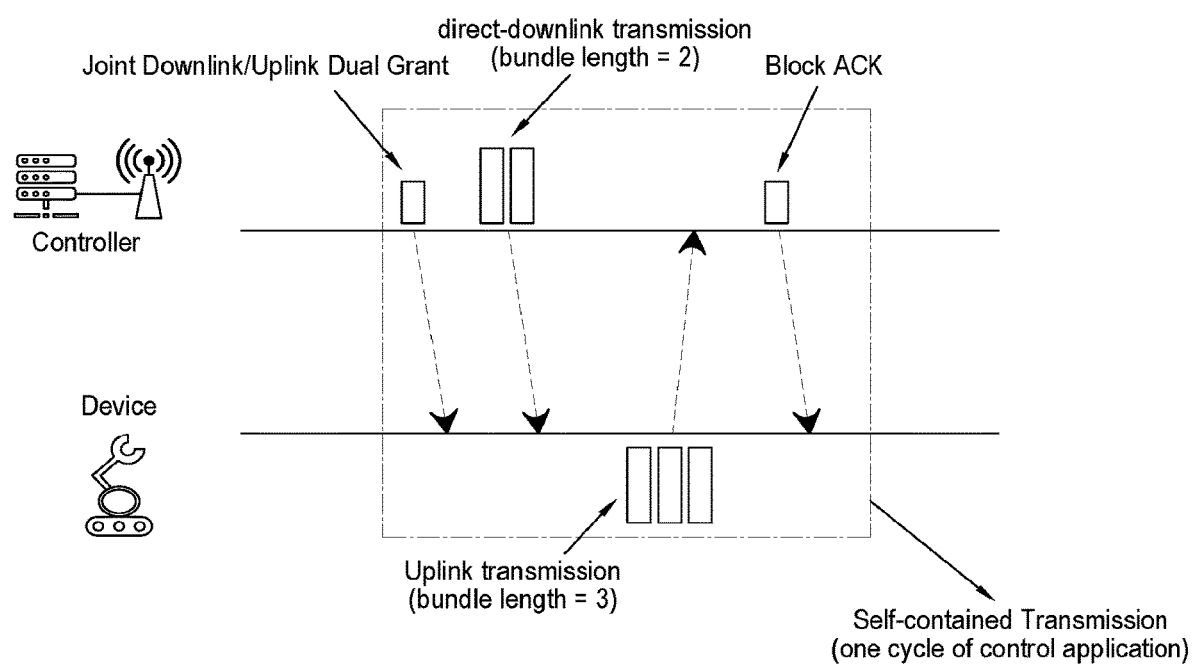
FIG. 6 illustrates resource allocation in accordance with an embodiment.

FIG. 6 illustrates resource allocation in accordance with an embodiment, and the concept of a self-contained transmission based on the aforementioned design aspects. It starts with a resource grant initiated by the controller for communication with the controlled device. The present embodiment implements a joint downlink/uplink grant which includes resource assignment for the downlink data transmission and resource grant for the successive uplink data transmission. The resource grant is followed by downlink data transmission(s). The downlink transmission can be a single transmission, or it can be a bundled transmission. As illustrated, a bundle of 2 transmissions is effected.

The downlink data transmissions are followed by uplink data transmission(s). Similar to the downlink, the uplink transmission can be a single transmission or a bundled transmission. As illustrated, a bundle of 3 transmissions is effected on the uplink.

Upon successful reception of the uplink transmission(s), the base station transmits a block ACK. The block ACK is transmitted after reception of the bundled transmission, i.e., the base station does not transmit ACKs for individual uplink transmissions. Moreover, the block ACK is transmitted if at least one of the uplink transmissions is successful. The joint downlink/uplink resource grant also allocates resources for transmission of block ACK.

Figure 7:
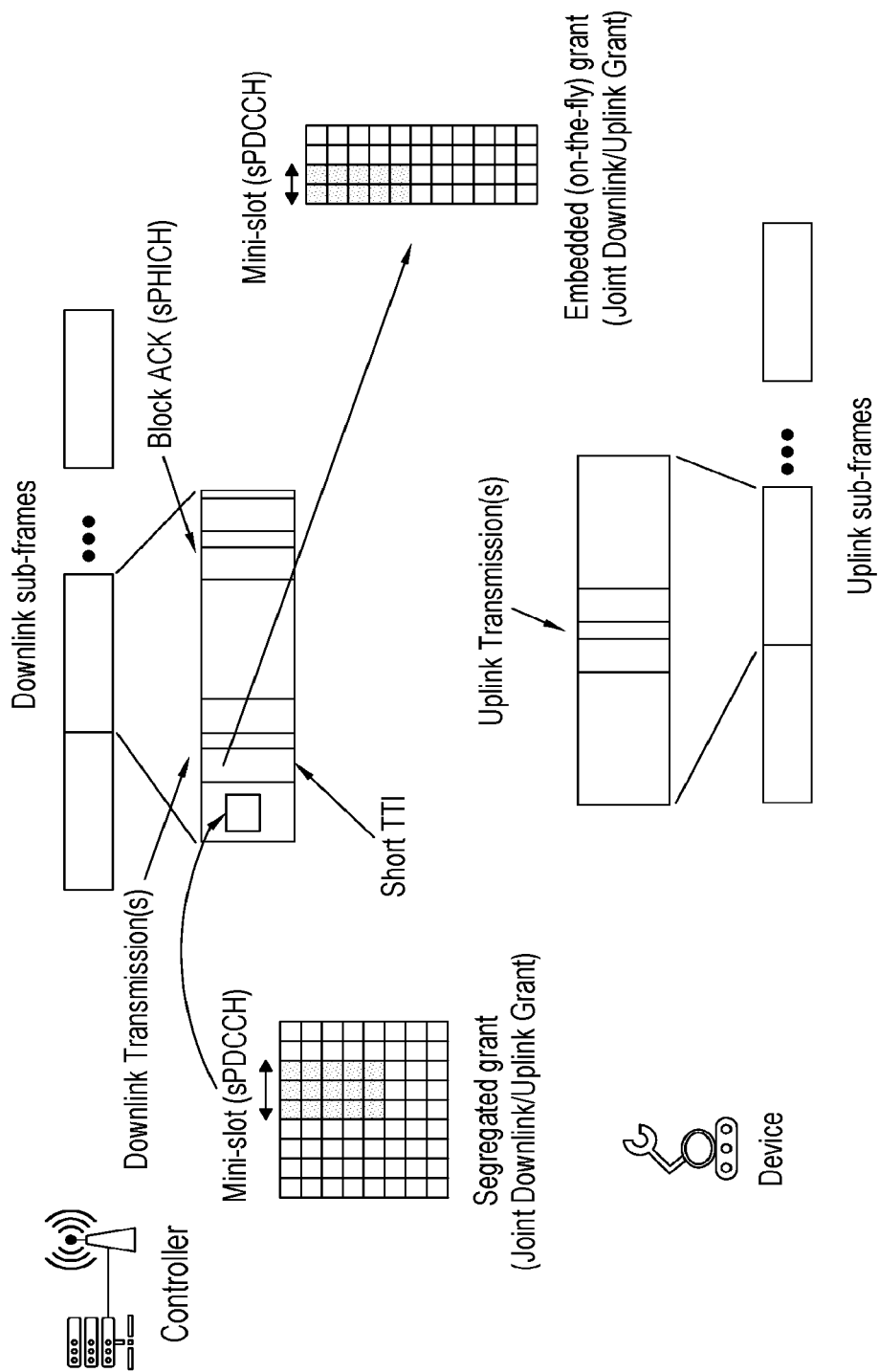
FIG. 7 illustrates self-contained transmissions in accordance with an embodiment.

FIG. 7 further illustrates self-contained transmissions aided by short TTIs and mini-slots. A sub-frame (in downlink as well as in uplink) is split into multiple short TTIs. The short TTIs can be reserved exclusively for control-centric applications requiring low latency. Alternatively, short TTIs can be merged to support bandwidth-hungry applications requiring high data rates. Short TTIs and mini-slots can be used in different ways.

In one case, mini-slots are used for signaling (control-plane information) while short TTIs are used for data (user-plane information). The controller informs the base station (through the wired interface) of its intent to start a closed-loop control application with a specific device. For this example, an assumption is made that the device is already in connected state. If the device is not in connected state, the base station performs necessary procedures to ensure that the device is in connected state. It is worth emphasizing the initial set up latency, before start of the control cycle, is not critical for the application.

The base station transmits a joint downlink/uplink grant on a mini-slot containing a short PDCCH (sPDCCH). The joint downlink/uplink grant can be segregated or embedded. In the former case, the grant is transmitted by defining a mini-slot outside the short TTI reserved for downlink transmission. In case of the latter, the grant is transmitted on-the-fly by defining a mini-slot in the same short TTI as reserved for downlink transmission. Both types of grants are illustrated in FIG. 7.

The base station also computes an appropriate bundle length for both downlink and uplink data transmissions. An example method to compute bundle lengths is discussed later in this disclosure. The bundle length is transmitted in the grant message.

Following the transmission of the grant message, downlink and uplink data transmissions take place in the short TTIs, i.e., through PDSCH and PUSCH respectively. A transmission in either downlink or uplink is repeated in adjacent TTIs as dictated by the bundle length. Upon successful reception of uplink transmission(s), the base station transmits a block ACK on a short PHICH (sPHICH) which is defined on a mini-slot. The base station allocates resources for this block ACK in the joint downlink/uplink grant.

Figure 8:
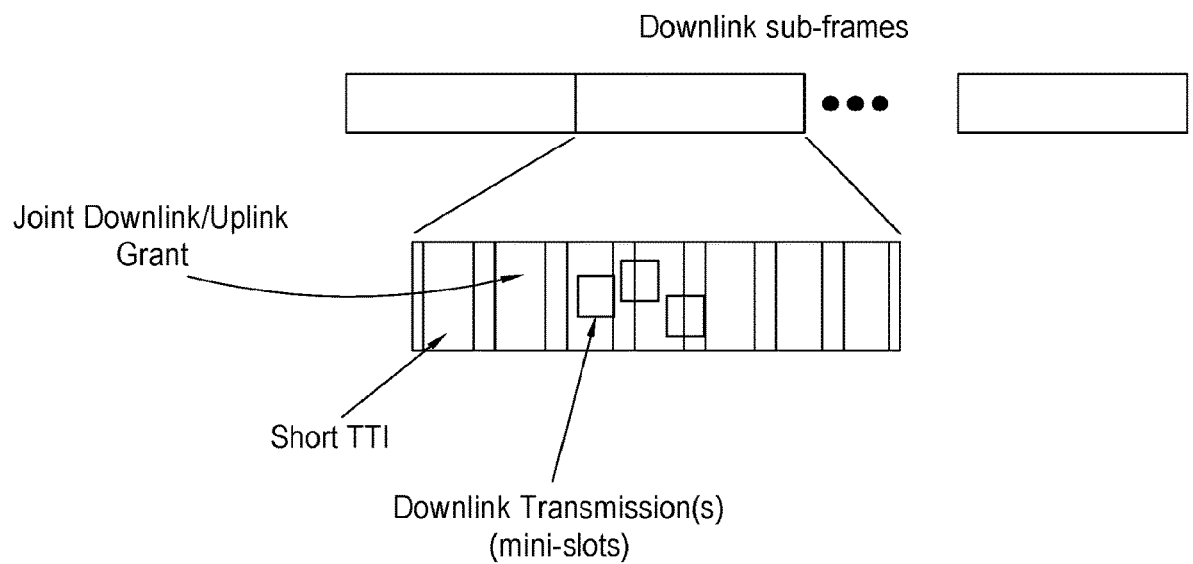
FIG. 8 illustrates allocation of resources in accordance with an embodiment.

FIG. 8 illustrates another case, in which mini-slots are used for user-plane information while short TTIs are used for signaling (control-plane) information. Such an approach further reduces latency as data transmissions do not have to wait for short TTIs, as a mini-slot can start at a symbol boundary. Moreover, the use of short TTIs for control-plane information provides flexibility in terms of physical control channel design.

In some embodiments of the proposed resource allocation framework, the self-contained transmissions are repeated to achieve higher reliability. A self-contained transmission can be unsuccessful if an uplink transmission from the device has failed or if an uplink transmission was not performed by the device due to a downlink transmission failure. The latter scenario is applicable to downlink-triggered closed-loop control applications. Upon detecting a failure of a self-contained transmission, the base station replaces the block ACK with a new joint downlink/uplink grant for repeating the self-contained transmission.

In some embodiments of the proposed resource allocation framework, bundled transmissions can be exploited to achieve a HARQ-like functionality, termed as proactive HARQ, without incurring the overhead and latency of conventional HARQ. The proactive HARQ functionality can be achieved in three distinct cases. In one case, each element of a bundled transmission contains data and forward error correction (FEC) information. In a second case, some elements of a bundled transmission contain data while others contain FEC information. In a third case, each element of a bundled transmission contains a varying amount of FEC information pertaining to the same data transmission.

The cyclic information exchange between the controller and the device can be handled in two distinct ways. In one embodiment, the downlink/uplink resources allocated for a self-contained transmission can be reserved for periodic information exchange between the controller and the device. This provides grant-less allocation for subsequent transmissions pertaining to cyclic information exchange. In another embodiment, the cyclic information exchange is handled through cycle-by-cycle resource allocation. In this case, a joint downlink/uplink grant is sent for one or more self-contained transmissions pertaining to cyclic information exchange. This approach has the benefit of dynamically adapting the bundle length per cycle which improves resource utilization.

The concept of a bundled transmission is not limited to transmission of user-plane information only. It can be extended to control-plane information as well. For example, the joint downlink/uplink resource grant can be bundled, i.e., it is sent over multiple mini-slots or short TTIs.

Figure 9:
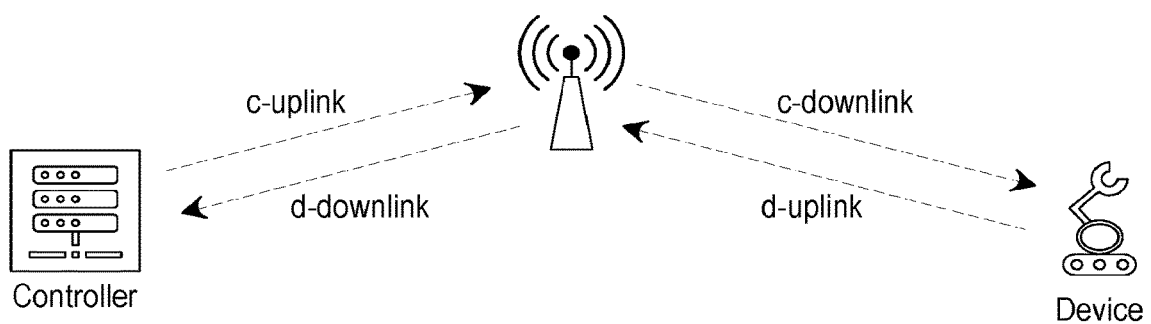
FIG. 9 illustrates an embodiment of a communication network.

FIG. 9 illustrates an example wherein a controller and a device are wirelessly connected to a base station through a wireless interface. In this case, the uplink from the controller to the base station, which contains the command message, is referred to as controller-uplink (c-uplink). This command message is transmitted by the base station to the device and it is referred to as controller-downlink (c-downlink). The uplink from the device, which contains sensory or actuation feedback from the device, is referred to as device-uplink (d-uplink). This feedback is transmitted by the base station to the controller and it is referred to as device-downlink (d-downlink).

Figure 10:
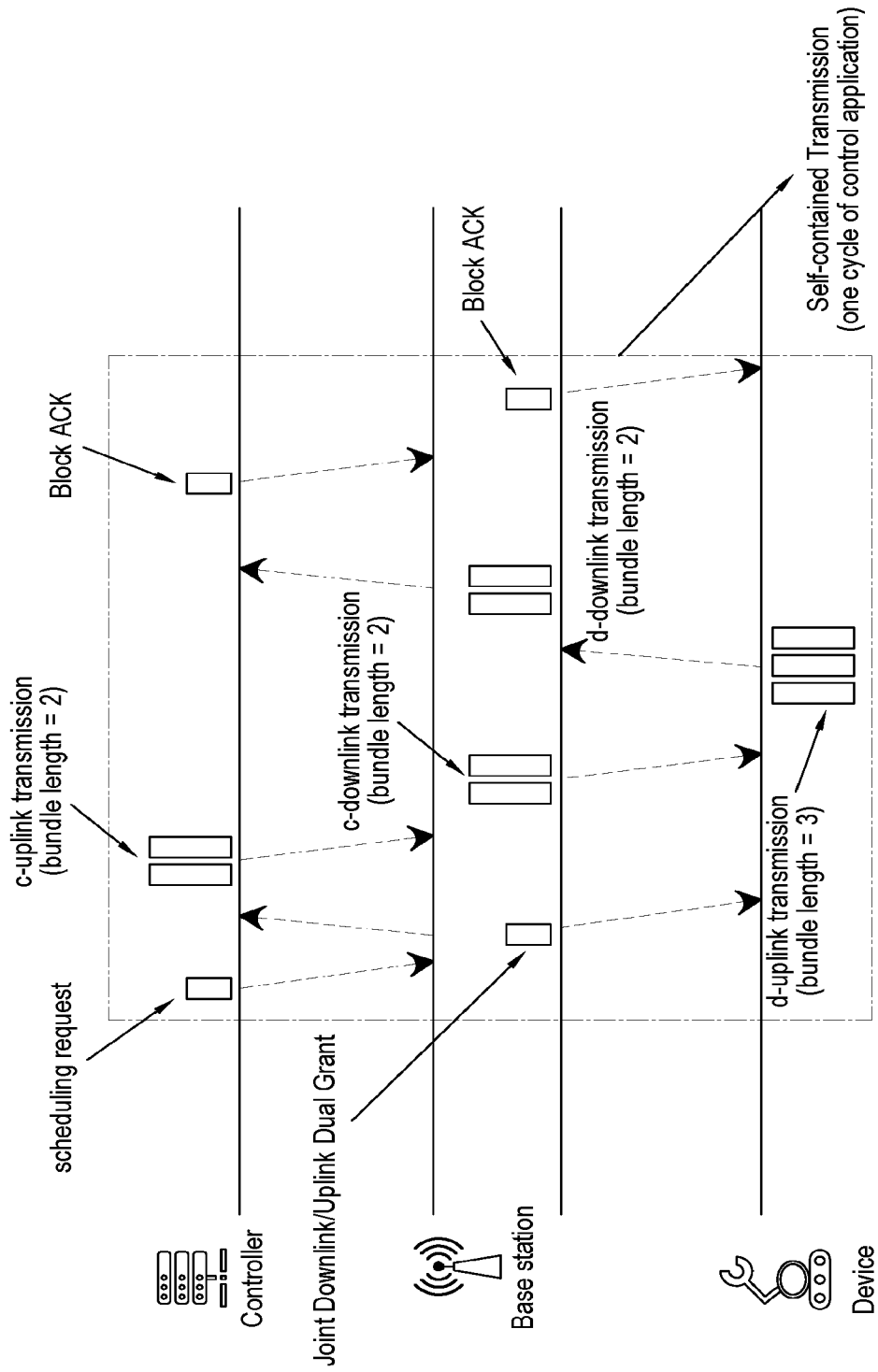
FIG. 10 illustrates resource allocation in accordance with an embodiment.

FIG. 10 illustrates a swim lane diagram for implementation of a self-contained transmission for this scenario. It is assumed that both the controller and the device are already in connected state before commencement of this transmission. The controller initiates the resource allocation procedure by transmitting a scheduling request message. The base station responds with a joint downlink/uplink dual grant which contains resource allocation for the controller as well as for the device. The resource grant contains a bundle length for c-uplink, c-downlink, d-uplink and d-downlink transmissions. Upon reception of the resource grant, the controller proceeds with the c-uplink transmission This is followed by the c-downlink transmission from the base station. Upon reception of c-downlink transmission, the device proceeds with the d-uplink transmission. Upon reception of d-uplink transmission, the base station proceeds with the d-downlink transmission. Note that all data transmissions can be single or bundled transmissions. The resource grant also allocates resources for transmission of block ACK messages. Upon reception of d-downlink transmission, the controller transmits a block ACK message. Upon reception of a block ACK message from the controller, the base station transmits a block ACK message to the device.

Similar to the case of the wireless controlled device, the self-contained transmission is enabled by mini-slots and short TTIs. It will be noted that the controller can transmit the scheduling request message on the conventional PUCCH, as the initial latency before start of the cycle is not critical. However, upon reception of the scheduling request for closed-loop control application, the base station transmits a joint downlink/uplink dual grant through a sPDCCH. The grant can be segregated or embedded as explained for the case of wireless controlled device only.

Figure 11:
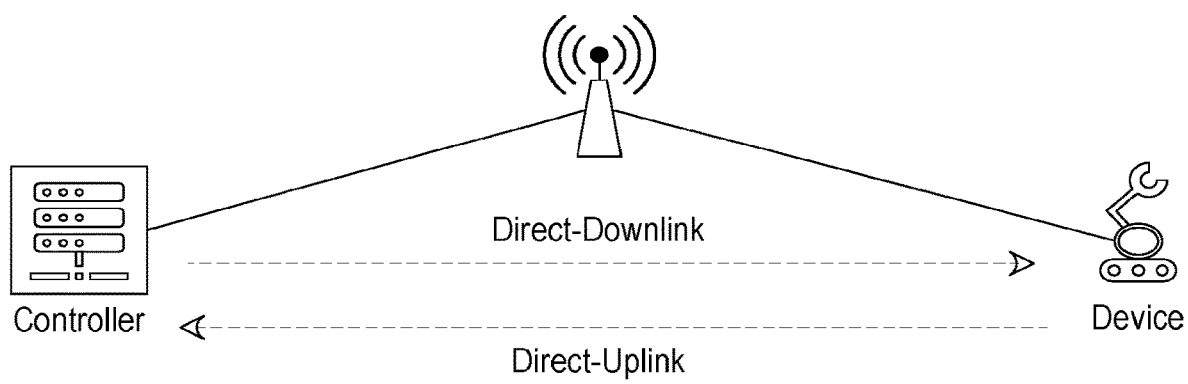
FIG. 11 an embodiment of a communication network.

A further example is illustrated in FIG. 11, in which case there is direct wireless connectivity between the controller and the device. Such connectivity is possible through device-to-device (D2D) communication paradigm (3GPP Release 12). D2D communication can take place as an underlay or an overlay.

In the former case, radio resources for D2D communication are shared with conventional cellular communication. In the latter case, D2D communication utilizes a dedicated pool of radio resources. A network-controlled resource allocation scenario is assumed for the purposes of this disclosure wherein radio resources for D2D communication are controlled by the base station in either underlay or overlay scenario.

Figure 12:
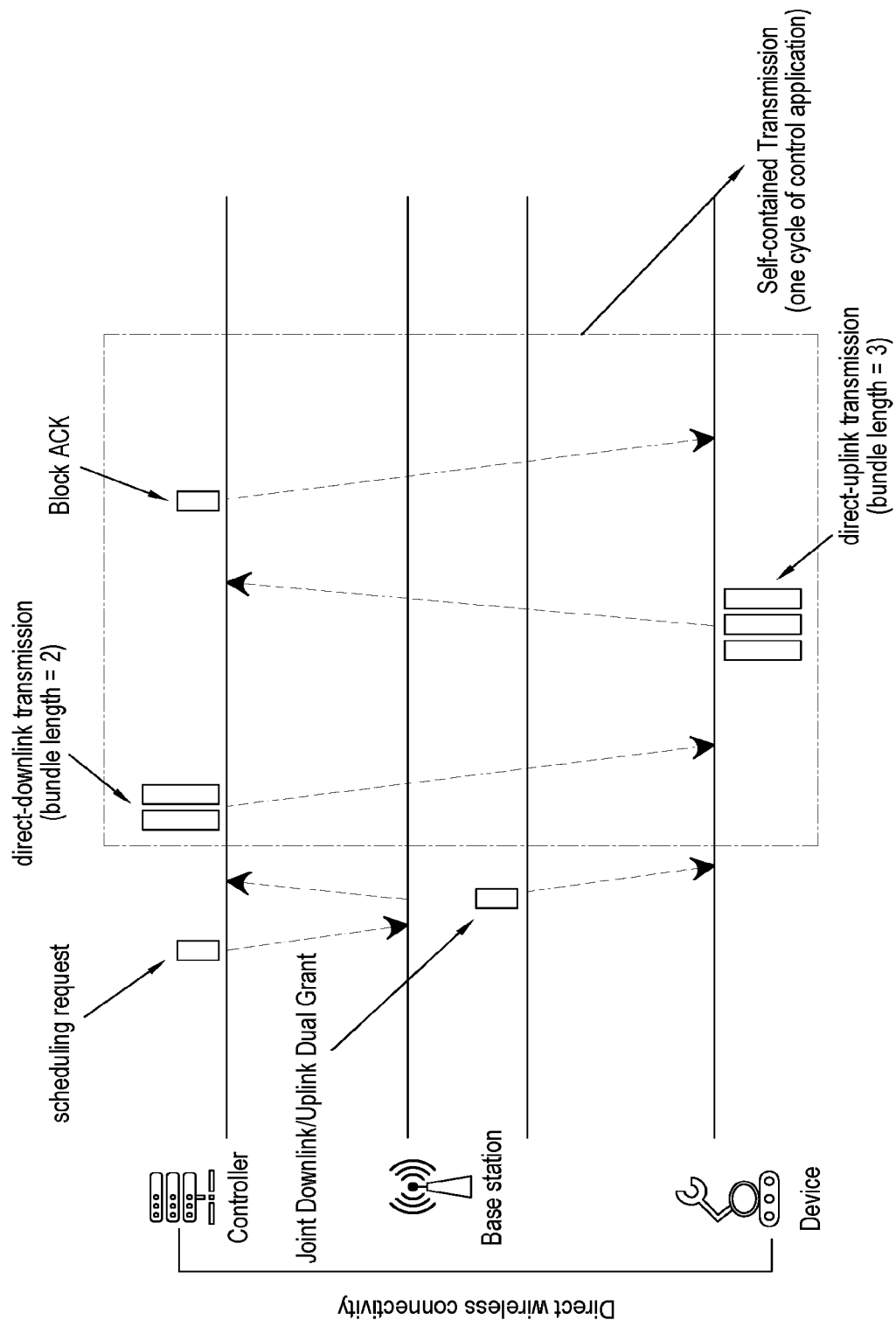
FIG. 12 illustrates resource allocation in accordance with an embodiment.

Again, it is assumes that the controller and the device are in connected mode. Further, it is assumed that any necessary neighbour discovery procedures have been performed by the controller or the device for D2D communication. The self-contained transmission in this case is shown in FIG. 12. To initiate data transmission for closed-loop control application, the controller transmits a scheduling request message to the base station on the conventional PUCCH. The base station sends a joint downlink/uplink grant for direct wireless connectivity between the controller and the device. This is followed by direct-downlink and direct-uplink transmissions between the controller and the device, respectively. The self-contained transmission in this case is similar to the wireless controlled device scenario discussed previously. With reference to cyclic information exchange between the controller and the device, two cases can be distinguished. In one case, the resources reserved for a self-contained transmission can be used for periodic information exchange. In another case, the base station provides a cycle-by-cycle grant for periodic information exchange between the controller and the device. The second case provides the capability of dynamically adapting bundle length per cycle.

The calculation of bundle length parameter is an important design issue. A higher bundle length is desirable from a reliability perspective. However, a higher bundle length also consumes more radio resources, particularly in the time domain. Adaptive bundle length computation provides is especially attractive for maximizing utilization of radio resources.

Figure 13:
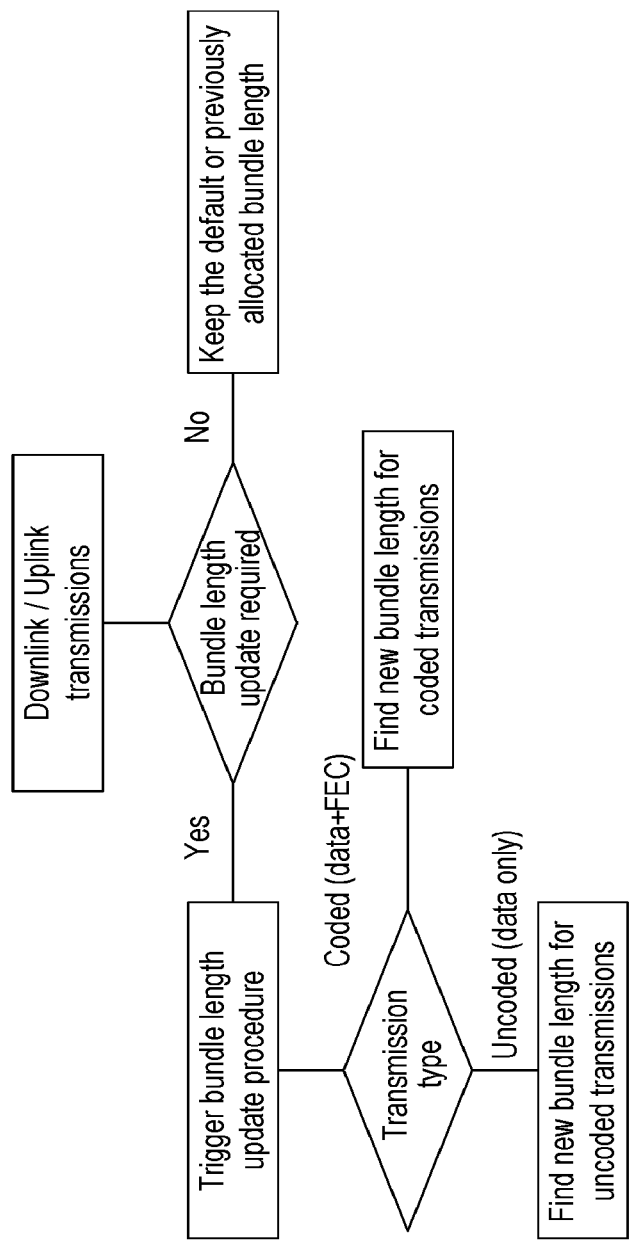
FIG. 13 illustrates a bundle length setting process in accordance with an embodiment.

Embodiments described herein implement an approach to determining bundle length for downlink uplink transmissions. The proposed approach, which is illustrated in FIG. 13, relies on received signal strength indicator (RSSI) information (estimate of received power). The RSSI information is available during the initial connection setup phase.

However, such information might be outdated for cyclic information exchange. Therefore, at the beginning of cyclic exchange, a default bundle length is selected for both downlink and uplink transmissions. The bi-directional information exchange provides the capability of acquiring up-to-date RSSI information. It is assumed that the device piggybacks downlink RSSI information on the uplink data transmissions.

In one embodiment, the base station maintains a set of bundle length values [1, 2, . . . , N_max] and selects the appropriate bundle length based on (N_max−1) RSSI thresholds.

In another embodiment, the objective of the bundle length adaption procedure is to fulfil a target signal-to-interference-plus-noise-ratio (SINR) requirement at the receiver. The base station maintains a moving average for RSSI of K previous downlink/uplink bundled transmissions which is denoted by $RSSI_K$. It also computes the mean RSSI and the RSSI variance of the most recent bundled transmission, denoted by $RSSI_{avg}$ and $RSSI_{var}$, respectively. The decision to adapt the bundle length is based on the following condition:

$$if(RSSI_{avg} < RSSI_{thresh}) OR (RSSI_{avg} < RSSI_K) OR (RSSI_{var} > RSSI_{thresh_{var}})$$

where RSSI_thresh is the threshold RSSI for fulfilling a certain SINR requirement at the receiver and RSSI_thresh_var is the threshold RSSI variance.

As mentioned earlier, there can be different scenarios for a bundled transmission in terms of transmitting data and FEC information. Two types of bundled transmissions are considered: coded transmissions and uncoded transmissions. In the former case, each additional element of a bundled transmission provides a gain which is based on the coding rate. The signal-to-noise ratio (SNR) of the ith transmission of the bundle is given by:

$$SNR(i) = SNR\_single + SNR\_gain(i)$$

where SNR_single denotes the SNR of a single transmission and SNR_gain is a function of coding rate. Similar relation can be extended to the case of uncoded transmissions. However, the SNR_gain of the ith transmission of the bundle is determined by the SNR versus transmission failure probability relationship.

The bundle length adaptation algorithm is shown in table 1.

---

Input parameters
SNR_thresh (threshold SNR); RSSI_thresh (threshold RSSI); RSSI_avg (mean RSSI of the bundle); Int_Margin (interference margin); Max_Length (maximum bundle length); Bundle_previous (previous bundle length)
Start procedure (bundle_length_update)
  Set RSSI_single = RSSI_avg; Calculate SNR_single from RSSI_single; Set SNR_bundle = SNR_single; Set Bundle_length = Bundle_previous
    while (SNR_bundle < SNR_thresh + Int_Margin) OR Bundle_Length = Max_Length
      Bundle_Length = Bundle_Length + 1;
      Calculate SNR_bundle with Bundle_Length
      if SNR_bundle > SNR_thresh + Int_Margin
        break
      end if
    end while
end procedure

---

The algorithm adopts an iterative approach and finds the appropriate bundle length that fulfils the target SINR requirement in downlink and uplink.

In some embodiments, the bundle length adaptation algorithm further considers the gain due to power adaptation, i.e., increasing the transmit power of downlink/uplink transmissions for a certain bundle length.

The achievable performance of embodiments of the present disclosure will now be explored.

In particular, the achievable latency of a self-contained transmission, which dictates the achievable cycle time, is examined under different configurations. Two legacy techniques are considered as baseline: scheduling request (SR)-based wherein uplink transmissions follow a resource grant-based process and reservation-based wherein resources for downlink/uplink are reserved. Both baseline techniques employ independent resource allocation in downlink and uplink. Processing times of 4 OFDM symbols for 5G-NR and 1 sub-frame for 4G-LTE, are assumed. The duration of an OFDM symbol for different numerologies is given in Table 2.

| Sub-carrier Spacing | 15 kHz | 30 kHz | 60 kHz | 120 kHz |
|---|---|---|---|---|
| OFDM symbol Duration (including cyclic prefix) | 71.35 μsec | 35.68 μsec | 17.84 μsec | 8.92 μsec |

A default bundle length of 2 transmissions is considered. Results in table 3 show the achievable latency for one cycle of communication between the controller and the device.

| | Cycle Time | | |
|---|---|---|---|
| Numerology and Configuration | Present examples | Legacy (SR-based) | Legacy (reserved) |
| 15 kHz; 14S TTI (4G-LTE) | 8 msec | 29 msec | 23 msec |
| 15 kHz; 4S short TTI; 4S mini-slot | 2.3 msec | 8.28 msec | 6.6 msec |
| 30 kHz; 4S short TTI; 4S mini-slot | 1.15 msec | 4.14 msec | 3.3 msec |
| 30 kHz; 2S short TTI; 2S mini-slot | 0.71 msec | 2.49 msec | 2.1 msec |
| 60 kHz; 2S short TTI; 2S mini-slot | 0.36 msec | 1.25 msec | 1.05 msec |

Table 3 captures the scenario wherein mini-slots are used for signaling and short TTIs are used for data. For legacy techniques, it is assumed that 1 HARQ retransmission in both downlink and uplink. Results in table 3 demonstrate that present examples provide opportunity for significant reduction in cycle time performance as compared to legacy techniques.

Figure 14:
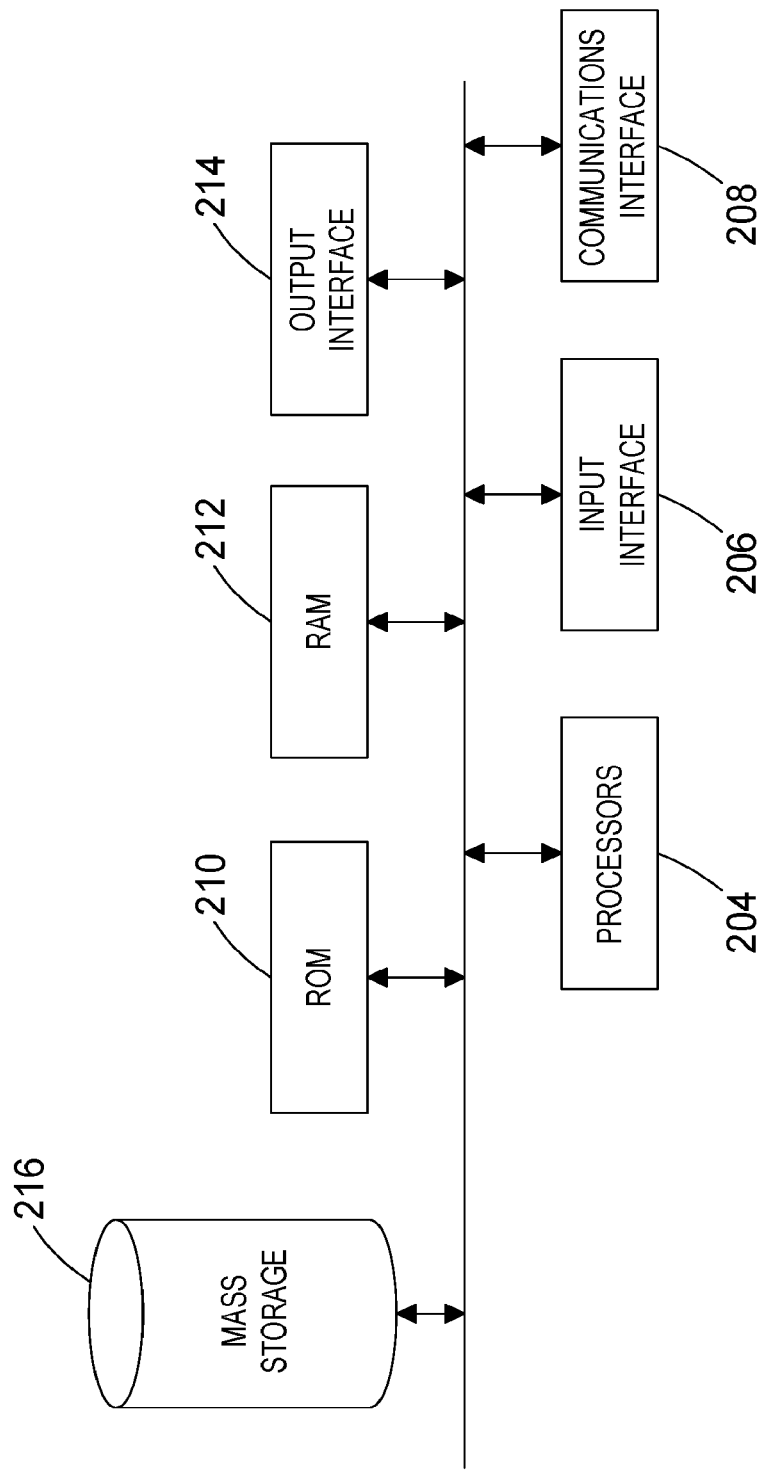
FIG. 14 illustrates a controller in accordance with an embodiment.

FIG. 14 is a schematic diagram of the internal architecture of a controller according to an embodiment.

As shown in FIG. 14, the controller 20 is a computer apparatus, in structure and function. It may share, with general purpose computer apparatus, certain features, but some features may be implementation specific. The reader will understand which features can be of general purpose type, and which may be required to be configured specifically for use as a controller in a communication network.

The controller 20 thus comprises one or more processors 204, either generally provisioned, or configured for other purposes such as mathematical operations, audio processing, managing a communications channel, and so on.

An input interface 206 provides a facility for receipt of user input actions. Such user input actions could, for instance, be caused by user interaction with a specific input unit including one or more control buttons and/or switches, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 214 is operable to provide a facility for output of signals to a user or another device. Such output could include a display signal for driving a local video display unit (VDU) or any other device.

A communications interface 208 implements a communications channel with one or more recipients of signals. In the context of the present embodiment, the communications interface is configured to cause emission and detection of signals in accordance with the previously described communications protocols.

The processors 204 are operable to execute computer programs, in operation of the controller 20. In doing this, recourse is made to data storage facilities provided by a mass storage device 208 which is implemented to provide large-scale data storage albeit on a relatively slow access basis, and will store, in practice, computer programs and, in the current context, video presentation data, in preparation for execution of an encoding process.

A Read Only Memory (ROM) 210 is preconfigured with executable programs designed to provide the core of the functionality of the controller 20, and a Random Access Memory 212 is provided for rapid access and storage of data and program instructions in the pursuit of execution of a computer program.

FIG. 15 is a schematic diagram of the internal architecture of a typical device 30, for engagement in communication with the controller 20 and for control thereby. The device 30 is a computer apparatus, in structure and function. It may share, with general purpose computer apparatus, certain features, but some features may be implementation specific. The reader will understand which features can be of general purpose type, and which may be required to be configured specifically for use as a controlled device in a wireless communication network.

The device 30 thus comprises one or more processors 304, either generally provisioned, or configured for other purposes such as mathematical operations, audio processing, managing a communications channel, and so on.

An input interface 306 provides a facility for receipt of user input actions. Such user input actions could, for instance, be caused by user interaction with a specific input unit including one or more control buttons and/or switches, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader. The input interface could be used, for example, to receive input signals from sensors of the device 30.

Likewise, an output interface 314 is operable to provide a facility for output of signals to a user or another device. Such output could include a display signal for driving a local video display unit (VDU) or any other device. The output interface could, for example, be used to actuate control of machinery.

A communications interface 308 implements a communications channel with one or more recipients of signals. In the context of the present embodiment, the communications interface is configured to enable reception of a signal structured in accordance with the previously described communications protocols.

The processors 304 are operable to execute computer programs, in operation of the device. In doing this, recourse is made to data storage facilities provided by a mass storage device 308 which is implemented to provide large-scale data storage albeit on a relatively slow access basis, and will store, in practice, computer programs and data in preparation for execution of the communication process.

A Read Only Memory (ROM) 310 is preconfigured with executable programs designed to provide the core of the functionality of the slave device 30, and a Random Access Memory 312 is provided for rapid access and storage of data and program instructions in the pursuit of execution of a computer program.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A controller comprising:
 a processor configured to:
  define a communication channel between the controller and a controlled device, the controller and the controlled device forming a closed loop control system via the communication channel, the communication channel including a wireless communications channel defined with respect to at least one of time or frequency; and
  generate a joint resource allocation message in response to a feedback signal from the controlled device, the joint resource allocation message including resource allocation information defining an allocation of a time-bound resource of the wireless communications channel, the allocation being for resource for communication from the controller to the controlled device and for resource for communication from the controlled device to the controller within the time-bound resource, to enable completion of a cycle of the closed loop control system within the time-bound resource and to form the closed loop control system between the controller and the controlled device; and
 a communications interface configured to transmit the joint resource allocation message to the controlled device.

2. The controller in accordance with claim 1, wherein the resource includes a plurality of timeslots defined within the time-bound resource.

3. The controller in accordance with claim 2, wherein the allocation is defined with respect to one or more of the plurality of timeslots defined within the time-bound resource.

4. The controller in accordance with claim 1, wherein the time-bound resource is defined as a plurality of frequency-defined sub-carriers for emission of wireless signals, the wireless signals being transmitted from the controller to the controlled device and from controlled device to the controller.

5. The controller in accordance with claim 3, wherein the allocation is defined with respect to one or more of the plurality of timeslots defined within the time-bound resource.

6. The controller in accordance with claim 1, wherein
 the processor is configured to calculate a bundle length parameter indicating a number of repetitions in adjacent timeslots, the number of repetitions corresponding to a number of individual transmissions, and
 at least one of a first communication or a second communication includes a bundle of transmissions, the first communication being from the controller to the controlled device, the second communication being from the controlled device to the controller, the bundle of transmissions including one or more individual transmissions, the bundle of transmissions being determined by the bundle length parameter.

7. The controller in accordance with claim 6, wherein the bundle length parameter is dependent on a measure of signal to interference plus noise (SINR) at the controlled device.

8. The controller in accordance with claim 6, wherein the communications interface is configured to transmit the bundle length parameter with the joint resource allocation message.

9. The controller in accordance with claim 6, wherein at least one transmission of the bundle of transmissions includes data, wherein at least one transmission of the bundle of transmissions includes forward error correction (FEC) information, and wherein the FEC information pertains to the bundle of transmissions.

10. The controller in accordance with claim 1, wherein the communications interface is configured to transmit the joint resource allocation message on a physical downlink control channel.

11. The controller in accordance with claim 10, wherein the joint resource allocation message is either transmitted alongside a downlink allocation reserved for communication to the controlled device, or is transmitted embedded in a downlink allocation reserved for communication to the controlled device.

12. A system comprising the controller in accordance with claim 1, a wireless communication process being executed between the controller and the controlled device,
 the controlled device comprising:
  a processor configured to generate the feedback signal; and
  a communications interface configured to:
   transmit the feedback signal to the controller; and
   receive the joint resource allocation message from the controller.

13. A base station comprising:
 a memory configured to store a joint resource allocation message from a controller;
 a processor configured to manage a wireless communication channel between the controller and a controlled device to establish a closed-loop control system including the controller and the controlled device, the wireless communication channel including a time-bound communication resource; and
 a communications interface configured to transmit the joint resource allocation message to the controlled device, the joint resource allocation message including resource allocation information defining an allocation of the time-hound resource of the wireless communications channel, the allocation being for resource for wireless communication from the controller to the controlled device via the base station and for resource for wireless communication from the controlled device to the controller within the time-bound resource, to enable completion of a cycle of the closed-loop control system within the time-hound resource and to form the closed loop control system between the controller and the controlled device.

14. The base station in accordance with claim 13, wherein the base station is responsive to an initiation message transmitted by the controller to issue the joint resource allocation message.

15. The base station in accordance with claim 14, wherein the controller and the base station are in wired communication with each other.

16. The base station in accordance with claim 14, wherein
the controller and the base station are in communication on the wireless communication channel,
the base station receives a resource allocation request sent by the controller initiating communication with the controlled device, and
the base station transmits the joint resource allocation message to both the controller and the controlled device in response to the resource allocation request.

17. A method of managing a wireless communication in a controller, the method comprising:
defining a communication channel between the controller and a controlled device, the controller and the controlled device forming a closed loop control system via the communication channel, the communication channel including a wireless communications channel defined with respect to at least one of time or frequency;
generating a joint resource allocation message in response to a feedback signal from the controlled device, the joint resource allocation message including resource allocation information defining an allocation of a time-bound resource of the wireless communications channel, the allocation being for resource for communication from the controller to the controlled device and for resource for communication from the controlled device to the controller within the time-bound resource, to enable completion of a cycle of closed loop control within the time-bound resource and to form the closed loop system between the controller and the controlled device; and
transmitting the joint resource allocation message to the controlled device.

18. A non-transitory computer readable medium storing executable instructions which are executed by a computer apparatus configured as a controller to provide operations of:
defining a communication channel between the controller and a controlled device, the controller and the controlled device forming a closed loop control system via the communication channel, the communication channel including a wireless communications channel defined with respect to at least one of time or frequency; a
generating a joint resource allocation message in response to a feedback signal from the controlled device, the joint resource allocation message including esource allocation information defining an allocation of a time-bound resource of the wireless communications channel, the allocation being for resource for communication from the controller to the controlled device and for resource for communication from the controlled device to the controller within the time-bound resource, to enable completion of a cycle of closed loop control within the time-bound resource and to form the closed loop system between the controller and the controlled device; and
transmitting the joint resource allocation message to the controlled device.

* * * * *